United States Patent
Ue et al.

(10) Patent No.: US 6,244,760 B1
(45) Date of Patent: Jun. 12, 2001

(54) CAMERA HAVING MECHANISM FOR SECURELY GUIDING OUT FILM

(75) Inventors: Takaaki Ue, Hachioji; Shinya Takahashi, Hino; Hitoshi Yoshida, Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/338,650

(22) Filed: Jun. 23, 1999

(30) Foreign Application Priority Data

Jun. 29, 1998 (JP) .................................................. 10-182611

(51) Int. Cl.⁷ .................................................. G03B 17/02
(52) U.S. Cl. .................................................. 396/440; 396/541
(58) Field of Search .................................. 396/415, 440, 396/535, 538, 54.1

(56) References Cited

U.S. PATENT DOCUMENTS

| | | | |
|---|---|---|---|
| 4,344,685 | * | 8/1982 | Milatz et al. .................. 396/541 |
| 4,982,909 | * | 1/1991 | Pagano .......................... 396/512 |
| 5,585,876 | * | 12/1996 | Kobayashi ..................... 396/440 |
| 5,708,888 | * | 1/1998 | Nishizawa ...................... 396/395 |
| 5,748,989 | * | 5/1998 | Sangregory et al. ............. 396/6 |
| 5,754,905 | * | 5/1998 | Yamamoto ..................... 396/415 |
| 5,887,211 | * | 3/1999 | Nakagawa et al. .............. 396/538 |
| 5,993,076 | * | 11/1999 | Fujii et al. ...................... 396/348 |

* cited by examiner

*Primary Examiner*—David M. Gray
(74) *Attorney, Agent, or Firm*—Frishauf, Holtz, Goodman, Langer & Chick, P.C.

(57) ABSTRACT

A camera uses a film cartridge for automatically guiding out a film when the film cartridge is mounted into a film cartridge chamber. A film cartridge unit has the film cartridge chamber. A rail plate unit is formed independently of the film cartridge unit and is also mechanically connected to the film cartridge unit. The rail plate unit faces the film for guiding the move of the film from the film cartridge chamber. The film cartridge unit has a guide route for securely guiding the film from the film cartridge chamber to the rail plate unit.

13 Claims, 3 Drawing Sheets

CAMERA HAVING MECHANISM FOR SECURELY GUIDING OUT FILM

BACKGROUND OF THE INVENTION

The present invention relates to a camera, and relates, more particularly, to a camera using a film cartridge of a type for automatically guiding out a film from the cartridge when the film cartridge is loaded into the camera.

A camera of this type has conventionally been provided by having a film cartridge chamber, a film winding chamber and a film rail formed in one unit together with a camera main body by an injection molding of a metal or a synthetic resin; the film rail being disposed between the film cartridge chamber and the film winding chamber, for guiding the move of a film between the film cartridge chamber and the film winding chamber.

This type of camera is configured with predetermined sizes between the film exit of the film cartridge chamber and an end part of the film rail at the film cartridge side such that, when a film cartridge to be accommodated in the film cartridge chamber is a film cartridge of a new system (IX240), a film is guided out securely from the film cartridge of the new system in the film cartridge chamber toward the film rail through the film exit, without causing the film to be stuffed or scratched.

In other words, these predetermined sizes are recommended for the purpose of the film cartridge of the new system (IX240).

By the way, according to the above-described conventional camera, since the film cartridge chamber, the film winding chamber and the film rail are formed integrally with a frame of the camera main body, it has been difficult to structure a variety of cameras by using this frame.

BRIEF SUMMARY OF THE INVENTION

It is an object of the present invention to provide a camera which makes it possible to provide structures of many kinds of cameras at low cost, and which can always guide securely a film from a film cartridge unit to a rail plate unit.

In order to achieve the above object, according to one aspect of the present invention, there is provided a camera using a film cartridge for pressing out a film when the film cartridge is loaded into a film cartridge chamber, the camera comprising:

a film cartridge unit having the film cartridge chamber; and a film rail plate unit different from the film cartridge unit, having a film rail for guiding the move of the film pressed out from the film cartridge, wherein the film cartridge unit is provided with a guide route for guiding the film pressed out from the film cartridge The film cartridge unit and the rail plate unit can be formed independently of each other.

Therefore, various kinds of film cartridge units and rail plate units can be prepared according to kinds of films and lens mirror frame units used in cameras. By mutually combining a film cartridge unit and a rail plate unit selected from these various kinds of units according to the need, it is possible to structure as many kinds of cameras as possible.

Among many kinds of cameras, there are those which use common units. This makes it possible to structure many kinds of cameras at low cost.

Further, by forming a film cartridge unit and a rail plate unit independently of each other, it is possible to set precisely the flow of a melted resin or a melted metal optimum for forming the respective units. Thus, it is possible to decrease the respective dimensions and weights of the units.

Furthermore, since the film cartridge unit has a structure for securely guiding out a film from the film cartridge chamber to the rail plate unit, any kind of camera formed by using this film cartridge unit can always guide securely the film from the film cartridge unit to the rail plate unit.

In order to achieve the above object, according to another aspect of the present invention, there is provided a camera using a film cartridge for pressing out a film when the film cartridge is loaded into a film cartridge chamber, the camera comprising:

a film cartridge unit having the film cartridge chamber; and a film rail plate unit formed independently of the film cartridge unit and being mechanically connected to the film cartridge unit, for guiding the move of the film pressed out from the film cartridge, the film rail plate unit having an aperture facing the film, wherein the film cartridge unit is provided with a guide route for guiding the film pressed out from the film cartridge.

This camera also functions in a similar manner to that of the camera of the above one aspect of the present invention, and also has similar effects.

In the camera according to this invention having the above-described structure, it is preferable that the film cartridge to be accommodated in the film cartridge chamber is a film cartridge of a new system such as IX240 or the like and that the above predetermined structure is formed based on prescribed recommended sizes.

However, the film cartridge unit and the above predetermined structure of the camera according to this invention can also be structured to be able to handle other films including, for example, the conventional 35 mm films, for the film cartridge other than the film cartridge of the new system.

In order to achieve the above object according to still another aspect of the present invention, there is provided a camera structured by combining a plurality of units, the camera comprising:

a film cartridge unit having a film cartridge chamber into which the film cartridge is loaded; and a film rail plate unit formed independently of the film cartridge unit and being mechanically connected to the film cartridge unit, for guiding the move of the film pressed out from the film cartridge, the film rail plate unit having an aperture facing the film, wherein the film cartridge unit is provided with a guide route for guiding the film pressed out from the film cartridge.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed descrip

DETAILED DESCRIPTION OF THE INVENTION

Figure 1:
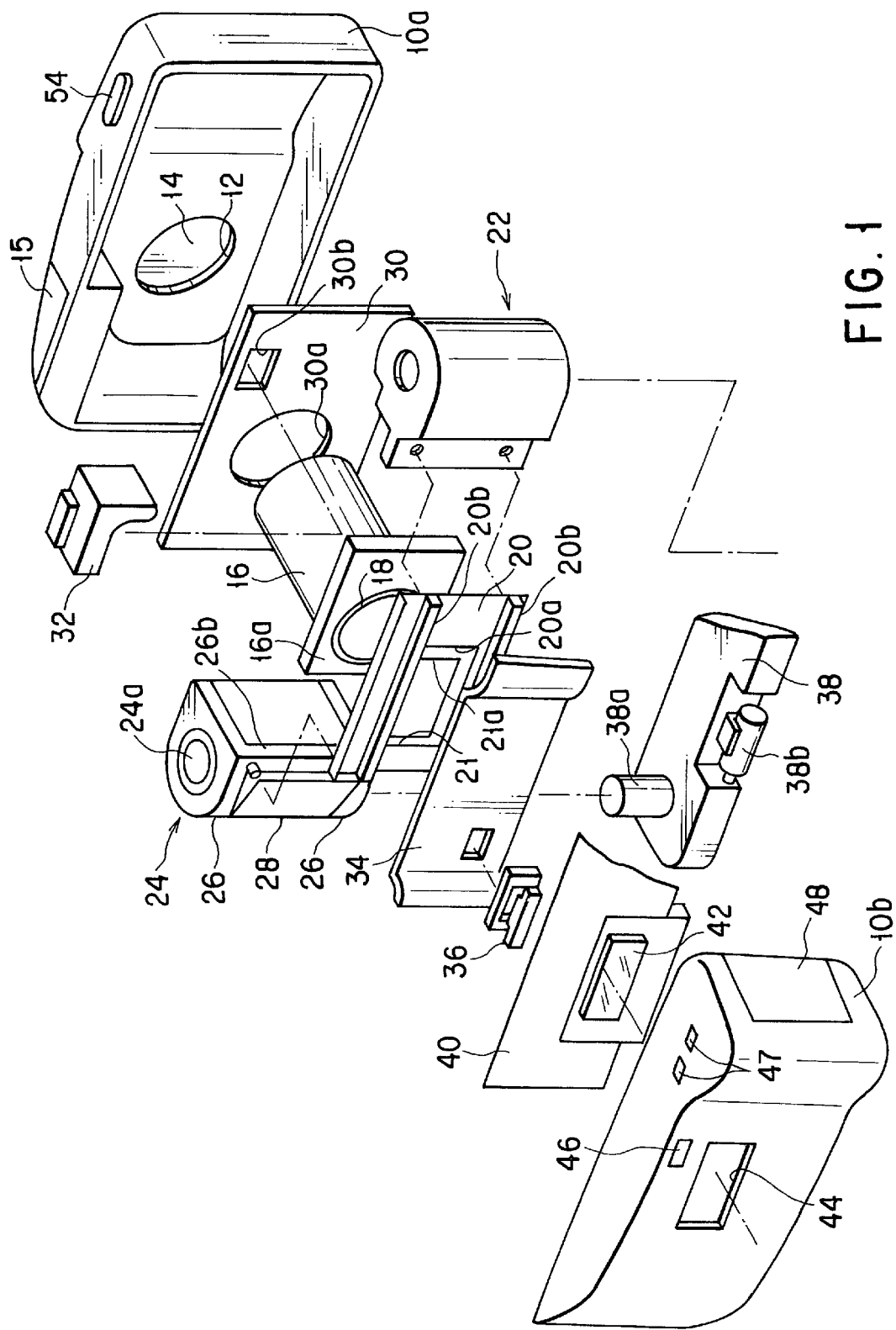
- FIG. 1 is a schematic exploded perspective view of a camera according to one embodiment of the present invention, as viewed from above the right diagonal back side of the camera.

Reference will now be made in detail to the presently preferred embodiments of the invention as illustrated in the accompanying drawings, in which like reference characters designate like or corresponding parts throughout the several drawings.

A camera according to one embodiment of the invention will be explained in detail with reference to the attached drawings.

At first, an overall structure of the camera according to the embodiment of the invention will be explained schematically with reference to FIG. 1 and FIG. 2.

FIG. 1 shows a schematic exploded perspective view of the camera according to the embodiment of the invention, as viewed from above the right diagonal back side of the camera.

Figure 2:
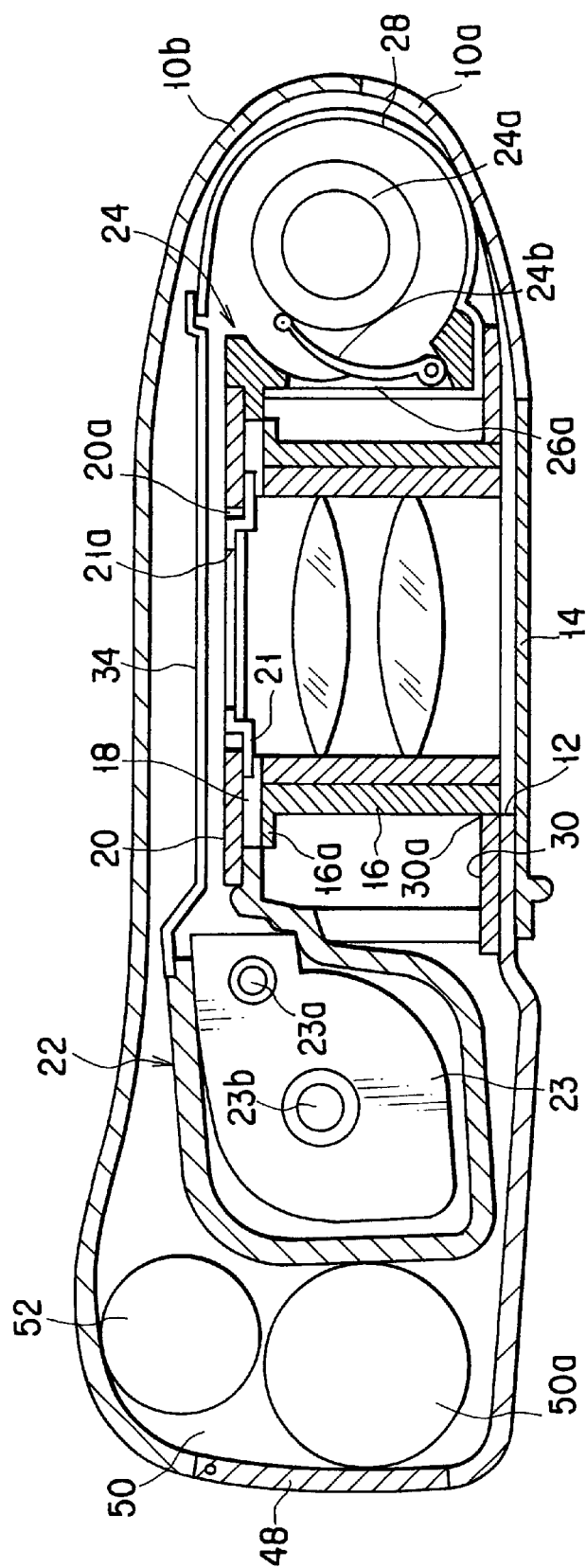
FIG. 2 is a schematic horizontal cross-sectional view of the camera according to the one embodiment of the invention.

FIG. 2 shows a schematic horizontal cross-sectional view of the camera according to this embodiment.

An external housing of this camera is configured by a front cover unit 10a and a rear cover unit 10b.

A lens mirror cylinder in-and-out aperture 12 is formed at approximately the center of the front cover unit 10a.

On the front surface of the front cover unit 10a, there is provided a barrier member 14 movable between a closing position for covering the lens mirror cylinder in-and-out aperture 12 and an exposing position for exposing the lens mirror cylinder in-and-out aperture 12 by moving along the front surface in the right direction from the closing position, as shown in FIG. 2.

In the following explanation of this embodiment, up/down and left/right positions are determined based on a case where the camera is looked at from the back side as a reference.

A flash unit 15 is provided at the left up corner of the front surface of the front cover unit 10a.

In the accommodation space encircled by the front cover unit 10a and the rear cover unit 10b, there is disposed a lens mirror frame unit 16 corresponding to the lens mirror cylinder in-and-out aperture 12 of the front cover unit 10a.

The lens mirror frame unit 16 is fixed to the front surface of a rail plate unit 20 in a state that a lens mirror frame supporting substrate 16a of a base end part involves an existence of an elastic circular light shielding member 18.

The rail plate unit 20 is formed with an aperture 20a corresponding to the lens mirror frame unit 16.

On the back surface of the rail plate unit 20, there are formed a pair of film rails 20b above and below the aperture 20a, extending in the left and right directions in parallel with each other.

End surfaces projecting backwards on the pair of film rails 20b structure film rail surfaces.

To the front surface of the rail plate unit 20, there is fixed a film aperture unit 21 having a film aperture 21a disposed in the aperture 20a.

This film aperture 21a has a smaller size than the aperture 20a.

The film aperture unit 21 is formed with a material much far thinner than the rail plate unit 20 in order to minimize blurs of a picked-up image (flare of the image in the vicinity of the picture frame) generated due to the lens mirror frame unit 16 by the reflection of a light at the periphery of the film aperture 21a. At the same time, the film aperture unit 21 is subjected to a light reflection preventing processing such as a coating of a light reflection preventing paint, for example.

Further, the film aperture 21a defines a screen frame of a film loaded on the pair of film rails 20b on the back surface of the rail plate unit 20.

In the present embodiment, the rail plate unit 20 includes the pair of film rails 20b having the backward projecting end surfaces that structure the film rail surfaces, and is also fixed with the film aperture unit 21 having the film aperture 21a.

Accordingly, in the present embodiment, the rail plate unit 20 can also be called an aperture member.

At the left and right end parts of the front surface of this rail plate unit 20, there are formed respectively a film cartridge unit 22 for structuring a film cartridge chamber and a spool unit 24 for structuring a spool chamber.

On the lower surface of the film cartridge unit 22, there is formed an aperture for taking in and out a film cartridge.

On the lower surface of the rear cover unit 10b, there is provided a lid that can be opened and closed (not shown) for the film cartridge corresponding to the aperture for the film cartridge of the film cartridge unit 22.

The film cartridge used in the camera of the present embodiment is a so-called new-system film cartridge (IX240), but the camera of the present invention can also be structured to be able to use a conventional 35 mm film cartridge.

FIG. 2 shows a film cartridge 23 of the new system accommodated in the film cartridge chamber of the film cartridge unit 22.

In other words, a hollow spool shaft 24a is rotatably accommodated in the spool chamber of the spool unit 24.

At a position adjacent to the lens mirror frame unit 16 on a side wall of the spool chamber of the spool unit 24, there is provided a film pressing plate 24b movable in a radial direction of the spool shaft 24a.

This film pressing plate 24b is biased toward an outer peripheral surface of the spool shaft 24a by biasing means not shown.

This film pressing plate 24b is used for an automatic winding of a film onto the spool shaft 24a.

According to the present embodiment, the spool chamber of the spool unit 24 is formed by having a pair of end walls 26 connected together at a part 26a adjacent to the lens mirror frame unit 16, the pair of end walls 26 being positioned at both sides in a width direction of the film winding.

A side wall facing the film between the pair of end walls 26 is structured at a portion other than the part 26a adjacent to the lens mirror frame unit 16, by an elastically deformable thin plate 28 with a larger area than the portion 26a.

To the front surface of the film cartridge unit 22 and the front surface of the spool unit 24 which are fixed to the left and right end parts of the front surface of the rail plate unit 20, there is fixed a reinforcing plate unit 30.

On the reinforcing plate unit 30, there is formed a lens mirror frame aperture 30a at a position corresponding to the lens mirror frame unit 16, and there is also formed a measuring aperture 30b at the right up corner.

The measuring aperture 30b of the reinforcing plate unit 30 is set opposite to a measuring window (not shown) provided at the right up corner of the front wall of the front cover unit 10a.

The back surface of the reinforcing plate unit 30 is fixed with an auto-focusing and finder control unit 32.

To the back surface of the film cartridge unit 22 and the back surface of the spool unit 24 which are fixed to the left and right end parts of the front surface of the rail plate unit 20, there is fixed a pressuring plate unit 34.

The pressuring plate unit 34 pressures a film (not shown) which is pushed out from the new-system film cartridge 23 in the film cartridge unit 22 and sent to the spool chamber of the spool unit 24, against the pair of rail members 20b of the rail plate unit 20 and defines a film reference surface with respect to the lens mirror frame unit 16.

Since the new-system film cartridge 23 is used in the present embodiment, there is provided at the left down corner of the pressuring plate unit 34 a magnetic head 36 for recording magnetic data on a magnetic recording track (not shown) formed along the lower edge of the film of the new system.

As described above, the film cartridge unit 22 and the spool unit 24 integrated together by the rail plate unit 20 and the reinforcing plate unit 30 are connected onto a motor driving unit 38.

The motor driving unit 38 is equipped with a motor 38a to be inserted into a center hole of the spool shaft 24a of the spool unit 24 and a mechanism for selectively transmitting rotational force from the motor 38a to a plurality of predetermined positions, such as, for example, rotational-force transmitting means including a train of wheels, and a plunger/solenoid assembly unit 38b for changing over a transmission destination of the rotational force by the rotational-force transmitting means to a plurality of predetermined positions.

In the present embodiment, the rotational-force transmitting means is connected respectively to the spool shaft 24a of the spool unit 24, a rotational center shaft 23a of a film exit opening/closing lid of the new-system film cartridge 23 in the film cartridge unit 22, and a film cartridge shaft 23b.

With the above arrangement, there are selectively carried out an opening and closing of the film exit opening/closing lid, a guiding-out of the film from the new-system film cartridge 23, a winding-up of the film around the new-system film cartridge 23, and a winding-up of a new film from the new-system film cartridge 23 around the spool shaft 24a.

In the accommodation space covered by the front cover unit 10a and the rear cover unit 10b of the external housing, there is further disposed a flexible printed circuit substrate unit 40 for structuring an electric control circuit of the camera of this embodiment, from the back side of the pressuring plate unit 34 to above the lens mirror frame unit 16, the film cartridge unit 22 and the spool unit 24 which are fixed to the center and the left and right end parts of the front surface of the rail plate unit 20 as described above.

This flexible printed circuit substrate unit 40 includes a liquid crystal display unit 42 positioned at the back of the pressuring plate unit 34.

The liquid crystal display unit 42 is disposed on a liquid crystal display window formed on the back wall of the rear cover unit 10b.

On the back wall of the rear cover unit 10b, there is formed a finder ocular window 46.

A finder unit (not shown) is disposed between the finder ocular window 46 and a finder objective window (not shown) formed adjacent to the measuring window (not shown) at the right up corner on the front wall of the front cover unit 10a.

On the upper wall of the rear cover unit 10b, there are disposed various kinds of mode change-over buttons 47 corresponding to various mode change-over switches (not shown) structured at an upper disposition portion of the flexible printed circuit substrate unit 40.

On the right wall of the rear cover unit 10b, there is disposed a battery chamber opening/closing lid 48.

The battery chamber opening/closing lid 48 makes it possible to take in and out a battery 50a to and from a battery chamber 50 structured between the film cartridge unit 22 and the battery chamber opening/closing lid 48 in the internal space of the rear cover unit 10b.

In the internal space of the rear cover unit 10b, there is further disposed a capacitor 52 for the flash unit 15 of the front cover unit 10a at the back side of the battery chamber 50.

On the upper wall of the front cover unit 10a, there is disposed a shutter button 54 corresponding to a shutter switch (not shown) structured at the disposition portion of the flexible printed circuit substrate unit 40.

As explained above in detail, the camera according to this embodiment is structured by combining a plurality of units including the front cover unit 10a, the rear cover unit 10b, the flash unit 15, the lens mirror frame unit 16, the rail plate unit 20, the film cartridge unit 22, the spool unit 24, the reinforcing plate unit 30, the auto-focusing and finder control unit 32, the pressuring plate unit 34, the motor driving unit 38, the flexible substrate unit 40 and the film aperture unit 21 which are formed in advance independently of one another.

Accordingly, in the case of forming a different kind of camera from that of the camera of the present embodiment, it is possible to utilize units which can be commonly used for the different kind of camera from among the above-described plurality of units of the camera of this embodiment.

Then, the camera of the different kind can be formed by only preparing units other than the above commonly usable units.

Since a plurality of kinds of cameras can be formed by utilizing the units which can be used commonly, it is possible to provide a plurality of kinds of cameras in the market at an early timing and at low cost.

Next, the structure of the film cartridge unit 22 will be explained in detail with reference to FIGS. 3A and 3B.

Figure 3A:
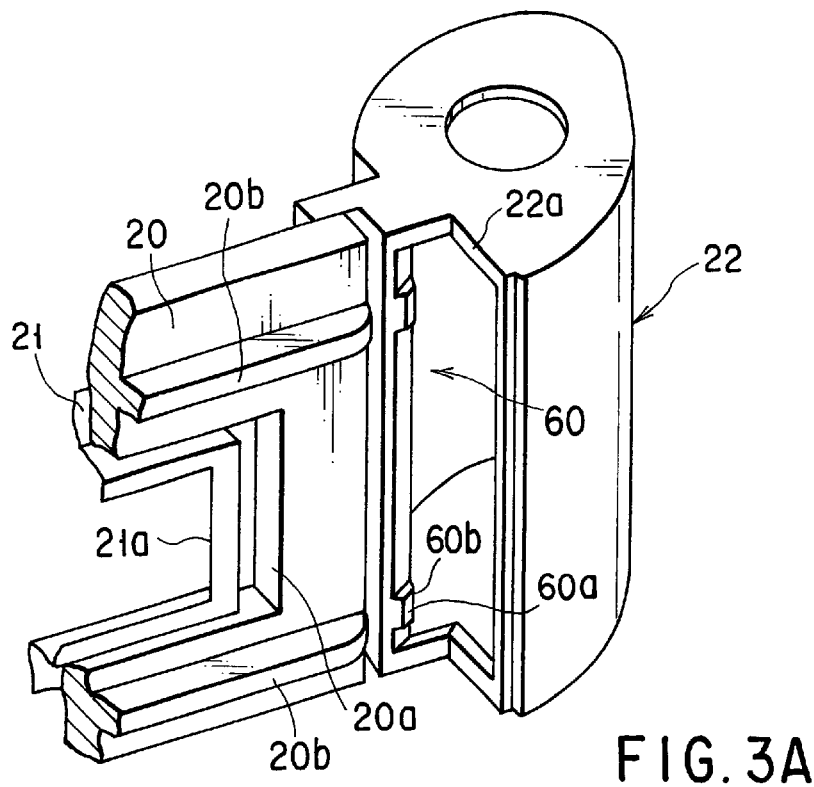
FIG. 3A is an enlarged perspective view of a film cartridge unit fixed to a rail plate unit in the camera according to the one embodiment of the invention, viewed from above the left diagonal back side of the camera.

FIG. 3A shows an enlarged perspective view of the film cartridge unit 22 fixed to the rail plate unit 20, viewed from above the left diagonal back side of the camera.

Figure 3B:
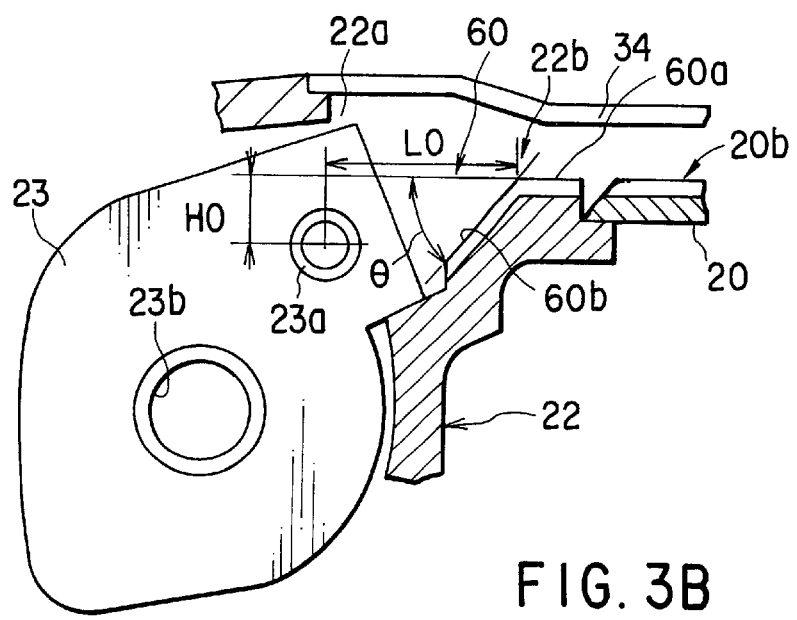
FIG. 3B is an expanded schematic horizontal cross-sectional view of a film exit of the film cartridge unit in FIG. 3A.

FIG. 3B shows an expanded schematic horizontal cross-sectional view of the film exit 22a of the film cartridge unit 22.

In the present embodiment, when the film cartridge unit 22 is fixed to the rail plate unit 20, the film exit 20a formed at the portion of the film cartridge unit 22 adjacent to the back surface of the rail plate unit 20 has a guide route 60 for securely guiding a film from a film exit aperture (not shown) of the new-system film cartridge 23 accommodated in the film cartridge chamber of the film cartridge unit 22 to the pair of film rails 20b of the rail plate unit 20, without causing the film to be stuffed or scratched.

This guide route 60 is formed by setting the sizes of the film exit 22a of the film cartridge unit 22 for accommodating the new-system film cartridge 23 based on the prescribed recommended sizes.

According to the recommended sizes, a certain point near the film exit 22a is called a gate point 22b.

According to this recommended size, the following are prescribed as recommended values: a distance $H_0$ which is a distance in a direction perpendicular to a plane part 60a, from the plane part 60a adjacent to the back surface of the rail plate unit 20 on the same surface and parallel with respect to the pair of film rails 20b, to the rotational center shaft 23a of the film exit opening/closing lid of the new-system film cartridge 23 in the film cartridge unit 22; an angle θ formed by a crossing between the plane part 60a and a sloped surface part 60b formed from the inner end of the plane part 60a (that is, the gate point 22b) extending toward the film exit aperture (not shown) of the new-system film cartridge 23; and a distance $L_0$ along the plane part 60a from the cross-point between the plane part 60a and the sloped surface part 60b (that is, the gate point 22b) to the rotational center shaft 23a of the film exit opening/closing lid of the new-system film cartridge 23.

The guide route or the member 60 formed based on these recommended values, with the gate point 22b used as the basis, configures a guide route for the film from the film exit aperture (not shown) of the new-system film cartridge 23 in the film cartridge chamber of the film cartridge unit 22 to the pair of film rails of the rail plate unit 20.

The film (not shown) pushed out from the film exit aperture (not shown) of the new-system film cartridge 23 loaded in the film cartridge chamber of the film cartridge unit 22 is smoothly guided to the pair of film rails 20b of the rail plate unit 20 according to this guide route, without causing the film to be stuffed or scratched.

Thus, the feeding of the new-system film in the camera of this embodiment is stabilized.

According to this embodiment, on the side wall positioned between the pair of the end walls 26 of the spool unit 24, the portion of the side wall other than the portion 26a adjacent to the lens mirror frame unit 16 is structured by the thin plate 28. Therefore, it is possible to make smaller the external dimensions other than the sizes of the part 26a adjacent to the lens mirror frame unit 16 on the side wall of the spool unit 24.

Furthermore, in addition to the above, it is also possible to make smaller the external dimensions of the respective facing parts of the front cover unit 10a and the rear cover unit 10b of the external housing.

Moreover, since the thin plate 28 includes a plane part 28b in the present embodiment, it is possible to make smaller the thickness of the part 26a of the spool unit 24 to have a slender shape.

As a result, it is possible to further promote the lightening of the spool unit 24 and to bring the spool unit 24 closer to the adjacent lens mirror frame unit 16, which leads to a further reduction in the external dimensions of the camera.

Further, when the thin plate 28 is structured by an elastic metal or by a synthetic resin having elasticity, light shielding property and conductivity, a static electricity generated by a friction between the film (not shown) guided into the spool chamber and the thin plate 28 can be discharged from the thin plate 28, by connecting the thin plate 28 to the grounding circuit of the flexible printed circuit substrate unit 40, for example.

Therefore, adhesion of dust to the thin plate 28 due to the storage of static electricity in the thin plate 28 can be prevented.

This leads to a prevention of the film from being hurt by dust.

Further, according to the present embodiment, by forming the film cartridge unit and the rail plate unit 20 independently of each other, it is possible to set precisely the flow of a melted resin or a melted metal optimum for forming the respective units. Therefore, it is possible to decrease the respective dimensions and weights of the units.

As is apparent from the above detailed description, the camera according to the present invention can also be expressed as follows.

In a camera using a film cartridge for automatically guiding out a film when the film cartridge is mounted into a film cartridge chamber, the camera comprises:

the film cartridge chamber; and a film aperture member having a film rail surface, as a separate body from the film cartridge chamber, and there is provided in the film cartridge chamber a member capable of sending out the film guided out from the film cartridge, without causing the film to be stuffed or scratched.

The camera, moreover, can be characterized in that the film aperture member includes a gate point of the IX240 film.

As is clear from the above detailed description, according to the present invention, it is possible to structure many kinds of cameras at low cost, and it is also possible to provide cameras capable of always securely guiding a film from the film cartridge unit to the rail plate unit.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera using a film cartridge having a film that is pushed out from the film cartridge, the camera comprising:

a film cartridge unit having a film cartridge chamber into which the film cartridge is loaded, said film cartridge chamber determining an attitude of the film cartridge; and an independent film rail plate unit, different from the film cartridge unit, having a film rail that guides movement of the film pushed out from the film cartridge, wherein the film cartridge unit is provided with a guide route that guides the film pushed out from the film cartridge to the independent film rail plate unit, and wherein the independent film rail plate unit is provided with an aperture for exposing the film to light.

2. A camera according to claim 1, wherein the guide route comprises a plane part formed in a longitudinal direction of the film rail plate unit and a sloped surface part formed at a predetermined angle with respect to the plane part.

3. A camera according to claim 2, wherein a gate point is formed at a cross-point between the plane part and the sloped surface part.

4. A camera according to claim 1, wherein the film cartridge chamber is adapted to receive an IX240 film cartridge.

5. A camera using a film cartridge having a film that is pushed out from the film cartridge, the camera comprising:
 a film cartridge unit having a film cartridge chamber into which the film cartridge is loaded, said film cartridge chamber determining an attitude of the film cartridge; and
 a film rail plate unit that is formed independently of the film cartridge unit and that is mechanically connected to the film cartridge unit,
 wherein the film rail plate unit guides movement of the film pushed out from the film cartridge, and is provided with an aperture facing the film for exposing the film to light, and
 wherein the film cartridge unit is provided with a guide route that guides the film pushed out from the film cartridge to the independently formed film rail plate unit.

6. A camera according to claim 5, wherein the guide route comprises a plane part formed in a longitudinal direction of the film rail plate unit and a sloped surface part formed at a predetermined angle with respect to the plane part.

7. A camera according to claim 6, wherein a gate point is formed at a cross-point between the plane part and the sloped surface part.

8. A camera according to claim 5, wherein the film cartridge chamber is adapted to receive an IX240 film cartridge.

9. A camera structured by combining a plurality of units, the camera comprising:
 a film cartridge unit having a film cartridge chamber into which a film cartridge is loaded, said film cartridge chamber determining an attitude of the film cartridge; and
 a film rail plate unit that is formed independently of the film cartridge unit and that is mechanically connected to the film cartridge unit,
 wherein the film rail plate unit guides movement of a film pushed out from the film cartridge, and is provided with an aperture facing the film for exposing the film to light, and
 wherein the film cartridge unit is provided with a guide route that guides the film pushed out from the film cartridge to the independently formed film rail plate unit.

10. A camera according to claim 9, wherein the guide route comprises a plane part formed in a longitudinal direction of the film rail plate unit and a sloped surface part formed at a predetermined angle with respect to the plane part.

11. A camera according to claim 10, wherein a gate point is formed at a cross-point between the plane part and the sloped surface part.

12. A camera according to claim 9, wherein the film cartridge chamber is adapted to receive an IX240 film cartridge.

13. A camera comprising:
 a camera body having a film rail that guides movement of a film pushed out from a film cartridge, and an aperture for exposing the film to photographic light; and
 a film cartridge chamber unit, formed independently of the camera body and connected to the camera body, for housing the film cartridge, said film cartridge chamber unit determining an attitude of the film cartridge,
 wherein the film cartridge film chamber unit has a sloped surfaced that guides the film pushed out from the film cartridge to the film rail in the camera body.

* * * * *